Patented Jan. 4, 1949

2,458,423

UNITED STATES PATENT OFFICE 2,458,423

N-ALLYL DERIVATIVES OF ACRYLIC ESTER-AMIDES AND POLYMERS THEREOF

Delbert D. Reynolds and John H. Van Campen, Rochester, N. Y., assignors to Eastman Kodak Company, Rochester, N. Y., a corporation of New Jersey No Drawing. Application November 22, 1947, Serial No. 787,609

7 Claims. (Cl. 260—83)

This invention relates to a new group of acrylic ester-amides containing an allyl group, polymers thereof, and to processes for their preparation.

The new N-allyl acrylic ester-amides of the invention can be represented by the structural formula:

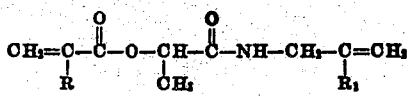

in which R represents an atom of hydrogen, a halogen atom (e. g. chlorine or bromine), a cyano group, a saturated alkyl group (e. g. methyl, ethyl, propyl, isopropyl, butyl, isobutyl, sec. butyl, tert. butyl, etc.), an aryl group (e. g. phenyl, naphthyl, tolyl, xylyl, etc.), an aralkyl group (e. g. benzyl, phenylethyl, etc.), an alkoxy or aryloxy group (e. g. methoxy, ethoxy, propoxy, isopropoxy, butoxy, phenoxy, etc.), a cycloalkyl group (e. g. cyclopropyl, cyclobutyl, cyclohexyl, etc.), an acyl group (e. g. acetyl, propional, butyryl, etc.), an acyloxy group (e. g. acetoxy, propionyloxy, butyryloxy, etc), a heterocyclic group (e. g. piperidyl), a carboxyl group, a carbalkoxy group (e. g. carbmethoxy, carbethoxy, etc.), an amino group (e. g. dimethylamino, diphenylamino, methylphenylamino, etc.), a diacylamido group (e. g. phthalimido, etc.), and similar groups, and R₁ represents hydrogen, a halogen (e. g. chlorine or bromine), or a saturated alkyl group (e. g. methyl, ethyl, propyl, isopropyl, butyl, etc.). The above defined new allyl groups containing ester-amides are non-resinous, crystalline compounds which have distinct melting points and physical properties, and are capable of isolation in substantially pure state as shown in the examples which follow. They are soluble in most of the common organic solvents such as benzene, chloroform, mixtures of diethyl ether and petroleum ether, acetone, dioxane, etc. The new ester-amides are also valuable intermediates for the preparation of other useful chemical compounds. They are also excellent modifying agents in compositions for impregnating paper and textile fabrics, being capable of polymerization to insoluble resins in the particular material so impregnated or treated. In addition, they are polymerizable alone or conjointly with other unsaturated compounds to products which have solubility characteristics associated with the three dimensional type of resins.

It is, accordingly, an object of the invention to provide a new group of acrylic ester-amides which contain an allyl group, and polymers thereof. Another object is to provide a method for preparing the same. Other objects will become apparent hereinafter.

In accordance with the invention, the new acrylic ester-amides are prepared by esterifying N-allyl lactamide or N-(β-substituted allyl) lactamides with acrylic or α-substituted acrylic anhydrides, or with acrylyl chlorides having the general formula:

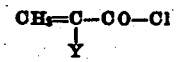

wherein Y represents hydrogen, a halogen atom, a cyano group, a saturated alkyl group, an aryl group, an aralkyl group, an alkoxy or aryloxy group, a cycloalkyl group, an acyl group, an acyloxy group, a heterocyclic group, a carboxyl group, a carbalkoxy group, an amino group or an acylamido group, as previously defined. Where the acid chlorides are employed as the esterifying agents, the reaction is carried out advantageously at a temperature not exceeding 40° C., in an inert solvent medium such as anhydrous benzene, methyl acetate, chloroform, dioxane, etc., and in the presence of an acid-binding agent, for example, anhydrous sodium carbonate, and a dehydrating agent, for example, anhydrous calcium sulfate. This process is described and claimed in copending application, Serial No. 787,605, filed of even date herewith, in the names of Delbert D. Reynolds and William O. Kenyon. Where the acid anhydrides are employed as the esterifying agents, the reaction can be carried out advantageously in the presence of a polymerization inhibitor such as a copper salt and an organic base such as pyridine.

Suitable lactamides for the preparation of the new ester-amides include N-allyl lactamide, N-β-methallyl lactamide, N-β-ethallyl lactamide, N-β-propallyl lactamide, N-β-isopropallyl lactamide, N-β-butallyl lactamide, N-β-sec. butallyl lactamide, N-β-isobutallyl lactamide, N-β-tert. butallyl lactamide, N-β-chloro lactamide, etc. These amides may be prepared by reacting alkyl esters of lactic acid such as, for example, methyl or ethyl lactate with allylamine or with an allylamine substituted on the beta-carbon atom with a saturated lower alkyl compound such as, for example, β-methallylamine, β-ethallylamine, β-propallylamine, β-isopropallylamine, β-butallylamine, β-sec. butallylamine, β-isobutallylamine, β-tert. butallylamine, β-chloroallylamine, etc. Ordinarily, the lactate is mixed together with an excess of the allylamine, the mixture heated and the lactamide product then isolated by fractional distillation. The above mentioned intermediate beta-substituted allylamines may be made by the method described in U. S. Patent 2,072,015, issued February 23, 1937.

The polymerization of the new ester-amides alone or conjointly with one or more other polymerizable compounds is accelerated by heat, and by polymerization catalysts which are known to accelerate the polymerization of acrylic compounds. Exemplary of such catalysts are the organic peroxides (e. g. benzoyl peroxide, acetyl peroxide and lauroyl peroxide), hydrogen peroxide, perborates (e. g. alkali metal perborates) and persulfates (e. g. alkali metal persulfates). The polymerization can be effected in mass or in the presence of a diluent such as, for example, dioxane. However, the monomers can also be emulsified in a liquid in which they are insoluble (e. g. water) and the emulsion subjected to polymerization. The monomers can also be suspended in water using relatively poor dispersing agents such as starch, and polymerized in the form of granules. The monomers can also be copolymerized with one or more other ethylenic monomers having the general formulas:

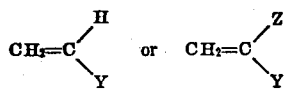

wherein Y and/or Z are alkyl, aryl, aralkyl, alkoxyl, aryloxyl, aralkoxyl, halogeno, acylamido, sulfonamido, sulfamyl, acyloxyl, carbalkoxyl, carbamide, nitrile, aldehydo, heterocyclic, dialkylamino, acylimino, etc. Specific compounds coming within the scope of the above formulas include among others 1,2-propylene, furylethylene, isobutylene, vinyl formate, vinyl acetate, vinyl propionate, vinyl butyrate, vinyl stearate, vinyl thioacetate, vinyl benzoate, vinyl oxalate, isopropenyl acetate, methylene dimethyl malonate, divinyl formal, acrolein, α-methacrolein, vinyl chloride, vinyl bromide, isopropenyl chloride, vinylidene chloride, vinyl chloroacetate, vinyl trichloroacetate, vinyl isocyanate, isopropenyl isocyanate, vinyl acetylene, vinyl urethane, vinyl methyl ketone, vinyl phenyl ketone, vinyl benzyl ketone, vinyl cyclohexyl ketone, vinyl furyl ketone, vinyl p-tolyl ketone, isopropenyl methyl ketone, vinyl methyl ether, vinyl butyl ether, divinyl ether, vinyl phenyl ether, isopropenyl methyl ether, vinyl sulfonamide, vinyl sulfonic acid, vinyl p-tolyl sulfoxide, vinyl β-naphthyl sulfone, vinyl p-tolyl sulfone, isopropenyl methyl sulfone, butadiene, isoprene, chloroprene, 2-acetoxy butadiene-1,3, N-vinyl acetamide, N-vinyl methylacetamide, N-vinyl phenylacetamide, N-vinyl ethylacetamide, N-vinyl methylforamide, N-vinyl acetanilide, N-vinyl p-tolyl acetamide, N-vinyl cyclohexylacetamide, N-vinyl N-methyl butyramide, N-vinyl pyrrole, N-vinyl pyrollidine, N-vinyl carbazole, vinyl pyridine, vinyl quinoline, styrene, α-methylstyrene, α-chlorostyrene, vinyl phenol, vinyl naphthalene, divinyl benzene, isopropenyl benzene, N-vinyl succinimide, N-vinyl tetrahydrophthalimide, N-vinyl phthalimide, N-vinyl glutarimide, N-vinyl diglycolylimide, N-isopropenyl phthalimide, acrylonitrile, methacrylonitrile, α-methoxyacrylonitrile, α-acetoxyacrylonitrile, α-chloroacrylonitrile, α-phthalimidoacrylonitrile, α-phenoxyacrylonitrile, acrylic acid, methacrylic acid, α-chloroacrylic acid, methyl acrylate, methyl methacrylate, methyl ethacrylate, benzyl acrylate, allyl methacrylate, β-ethoxyethyl acrylate, acrylamide, N-diacetyl acrylamide, N-ethyl acrylamide, N-diethyl acryl-amide, etc. Still other unsaturated compounds which can be copolymerized with the new unsaturates of the invention to give valuable resinous products include the esters, amides and nitriles of maleic, fumaric, malemic, fumaramic, citraconic and itaconic acids. Examples of the latter compounds include methyl maleate, methyl fumarate, dimethyl maleate, diethyl maleate, dimethyl fumarate, diethyl fumarate, diisopropyl maleate, diisopropyl fumarate, maleamide, fumaramide, itaconamide, maleonitrile, fumaronitrile, citracononitrile, itacononitrile, and similar compounds.

The preferred copolymers of the invention are obtained with starting polymerization mixtures having from 0.2 to 99.8 parts by weight of the new N-allyl acrylic ester-amide and from 99.8 to 0.2 parts by weight of one or more of the other above mentioned unsaturated organic compounds.

The following examples will serve to illustrate our new ester-amides, polymers thereof, and the process of their preparation.

*Example 1.—N-allyl lactamide*

A mixture of 236 gms. of ethyl lactate and 348 gms. of allylamine was heated on a steam bath for a period of 30 hours. The excess allylamine and other low-boiling by-products were distilled from the mixture at a pressure of 15 to 20 mm. The residue was finally distilled at 116° C. at 1 mm. pressure. Analysis for nitrogen indicated that the clear, colorless, mobile liquid thus obtained was practically pure N-allyl lactamide. This compound is described and claimed in co-pending application, Serial No. 787,604, filed of even date herewith, in the names of W. O. Kenyon and J. H. Van Campen.

*Example 2.—N-allyl α-methacryloxy propionamide*

258 gms. of N-allyl lactamide, 400 gms. of methacrylic anhydride, 15 cc. of anhydrous pyridine and 5 gms. of copper carbonate were mixed together and heated on a steam bath for a period of 18 hours. To this mixture was added 500 cc. of benzene, and the resulting solution washed with an aqueous sodium carbonate solution and then with water. The benzene layer was dried over anhydrous magnesium sulfate and the benzene evaporated off by means of a stream of dry air blowing on the surface. The product, N-allyl α-methacryloxy propionamide, crystallized out of the solution, and after recrystallization from a low boiling hydrocarbon solvent had a melting point of 64° C. Analysis for nitrogen gave 7.07 per cent by weight as compared with calculated theory of 7.11 per cent.

In place of the N-allyl lactamide in the above example, there was substituted 286 gms. of N-β-methallyl lactamide to give the compound N-β-methallyl α-methacryloxy propionamide.

*Example 3.—N-allyl α-acryloxy propionamide*

A mixture of 1 liter of anhydrous chloroform, 200 gms. of anhydrous sodium carbonate, 400 gms. of anhydrous calcium sulfate and 109 gms. of allyl lactamide was stirred for one hour. The mixture was cooled to 10° C. and 100 gms. of acrylyl chloride added. The temperature of the reaction mixture was allowed to rise to room temperature, then warmed to 30° C. and stirred at this temperature for an additional five hours. There was added 50 cc. of anhydrous pyridine, followed by 12 more hours of stirring. The reaction mixture was filtered and the filtrate evaporated to a thick syrup at room temperature. A mixture of diethyl ether and petroleum ether was stirred into the syrup, until the mixture became homogenous. Upon removal of this solvent mixture, the product, N-allyl α-acryloxy propionamide, separated out of solution in the form of crystals.

Example 4.—Poly-N-allyl α-methacryloxy propionamide 5 gms. of N-allyl α-methacryloxy propionamide were mixed with 50 gms. of benzoyl peroxide and warmed on a steam bath. In less than 10 minutes, there had formed a clear, hard polymer. This polymer was insoluble in all common organic solvents.

Example 5.—Poly-N-allyl α-acryloxy propionamide 10 gms. of N-allyl α-acryloxy propionamide were mixed with 25 cc. of anhydrous dioxane and 0.1 gm. of benzoyl peroxide added. After warming for a period of about one-half hour on a steam bath, a white, insoluble polymer had precipitated. This polymer was washed with methanol and dried. It was insoluble in all common organic solvents.

Example 6.—Copolymer of N-allyl α-methacryloxy propionamide and methyl methacrylate A mixture of 1 gm. of N-allyl α-methacryloxy propionamide, 19 gms. of methyl methacrylate and 0.1 gm. of benzoyl peroxide was placed into a pyrex tube, which was sealed and put into a 60° C. water bath. The copolymer obtained was a clear, hard, bubbly mass and was insoluble in organic solvents.

Example 7.—Copolymer of N-allyl α-methacryloxy propionamide, isopropenyl acetate and diethyl fumarate A mixture of 1 gm. of N-allyl α-methacryloxy propionamide, 7 gms. of isopropenyl acetate, 12 gms. of diethyl fumarate and 0.1 gm. of benzoyl peroxide was sealed in a pyrex glass tube and placed in a 60° C. water bath. A clear, hard copolymer was obtained. This copolymer was insoluble in acetone and other organic solvents.

In place of the N-allyl α-methacryloxy propionamide in the above example, there was substituted 1 gm. of N-β-methallyl α-methacryloxy propionamide to give a similar clear, hard and insoluble copolymer.

Example 8.—Copolymer of N-allyl α-acryloxy propionamide and styrene

A mixture of 18.3 gms. of N-allyl α-acryloxy propionamide, 10.4 gms. of styrene and 0.3 gm. of benzoyl peroxide was heated in a sealed glass tube at 50° C. for a period of two days. During this time, there was formed in the tube a clear, hard copolymer, which was insoluble in all common organic solvents.

Example 9.—Copolymer of N-allyl α-acryloxy propionamide and methyl acrylate

A mixture of 18.3 gms. of N-allyl α-acryloxy propionamide, 8.6 gms. of methyl acrylate and 0.3 gm. of benzoyl peroxide was heated in a sealed tube at 50° C., for a period of 2 days. The clear, hard polymer thus obtained was insoluble in all common organic solvents.

Example 10.—Copolymer of N-allyl α-acryloxy propionamide and vinyl acetate

A mixture of 18.3 gms. of N-allyl α-acryloxy propionamide, 8.6 gms. of vinyl acetate and 0.3 gm. of benzoyl peroxide was heated in a sealed tube at 50° C. for a period of 2 days. A clear, soft, but firm resin was obtained which was insoluble in all common organic solvents.

Other examples of our new copolymeric compounds prepared in similar manner as the preceding examples are illustrated in the following table:

| N-Allyl α-methacryloxy propionamide, percent by weight | Second monomer, percent by weight | Characteristics of Copolymer |
|---|---|---|
| 1 | 99 Methyl methacrylate | Clear, hard and bubbly. Insoluble in organic solvents. |
| 2 | 98 Methyl methacrylate | Do. |
| 5 | 95 Methyl methacrylate | Do. |
| 1 | 99 Vinyl acetate | Hard, crumbly and insoluble in organic solvents. |
| 2 | 98 Vinyl acetate | Do. |
| 5 | 95 Vinyl acetate | Do. |
| 1 | 99 Styrene | Hard and insoluble in 1,4-dioxane. |
| 2 | 98 Styrene | Do. |
| 5 | 95 Styrene | Do. |
| 1 | 99 Diethyl fumarate | Clear, soft and insoluble in organic solvents. |
| 2 | 98 Diethyl fumarate | Clear, rubbery and insoluble in organic solvents. |
| 5 | 95 Diethyl fumarate | Hazy, rubbery and insoluble in organic solvents. |
| 1 | 36.5 Isopropenyl acetate, 62.5 Diethyl fumarate | Hard, clear and insoluble in organic solvents. |
| 2 | 36 Isopropenyl acetate, 62 Diethyl fumarate | Do. |
| 5 | 35 Isopropenyl acetate, 60 Diethyl fumarate | Do. |
| 1 | 36.5 Vinyl acetate, 62.5 Diethyl fumarate | Hard, clear and insoluble in organic solvents. |
| 2 | 36 Vinyl acetate, 62 Diethyl fumarate | Do. |
| 5 | 35 Vinyl acetate, 60 Diethyl fumarate | Do. |

When completely polymerized, all the homopolymers and copolymers made from our new ester-amides are insoluble in all the common organic solvents, indicating thereby a definite cross-linking property. Due to the presence, however, of the lactic acid group interposed between the unsaturated end groups of the ester-amide molecule, the cross-links between the resin chains are longer and allow more movement between the polymer molecules so cross-linked. As a consequence, the new polymers are less compact and dense, and accordingly have improved physical properties over polymers not containing the lactic acid group. This permits of wider application of these polymers. For example, any of the monomeric ester-amides or mixtures of the monomeric ester-amides with one or more of the other monomeric unsaturated compounds, above mentioned, may be employed in solution in an organic solvent or in suspension in a carrier medium such as water, and containing filling materials and other substances such as a polymerization catalyst, to impregnate or coat paper, textile materials such as threads, fibers, fabrics of cellulose, cellulose esters and synthetic textile materials, etc., followed by heating the impregnated or coated material to polymerize the unsaturated constituents

We claim:
1. A compound having the general structural formula:

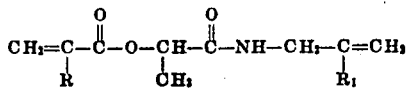

wherein R represents a member selected from the group consisting of an atom of hydrogen, a halogen atom, a cyano group, an alkyl group, an aryl group, an aralkyl group, an alkoxy group, an aryloxy group, a cycloalkyl group, a carboxylic acid acyl group, a carboxylic acid acyloxy group, a piperidyl group, a carboxyl group, a carbalkoxy group and an amino group, and $R_1$ represents a member selected from the group consisting of an atom of hydrogen, a halogen atom and an alkyl group.

2. N-allyl α-methacryloxy propionamide.
3. N-allyl α-acryloxy propionamide.
4. N-β-methallyl α-methacryloxy propionamide.
5. A polymer of a compound having the general structural formula:

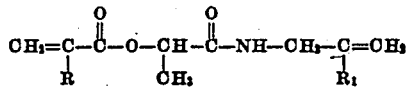

wherein R represents a member selected from the group consisting of an atom of hydrogen, a halogen atom, a cyano group, an alkyl group, an aryl group, an aralkyl group, an alkoxy group, an aryloxy group, a cycloalkyl group, a carboxylic acid acyl group, a carboxylic acid acyloxy group, a piperidyl group, a carboxyl group, a carbalkoxy group and an amino group, and $R_1$ represents a member selected from the group consisting of an atom of hydrogen, a halogen atom and an alkyl group.

6. A copolymer of from 0.2 to 99.8 parts by weight of N-allyl α-methacryloxy propionamide and from 99.8 to 0.2 part by weight of methyl methacrylate.

7. A copolymer of from 0.2 to 99.8 parts by weight of N-allyl α-acryloxy propionamide and from 99.8 to 0.2 part by weight of styrene.

DELBERT D. REYNOLDS.
JOHN H. VAN CAMPEN.

REFERENCES CITED

The following references are of record in the file of this patent:

UNITED STATES PATENTS

| Number | Name | Date |
| --- | --- | --- |
| 2,141,546 | Strain | Dec. 27, 1938 |
| 2,311,548 | Jacobson et al. | Feb. 16, 1943 |